United States Patent [19]

Wicnienski et al.

[11] Patent Number: 4,468,562
[45] Date of Patent: Aug. 28, 1984

[54] DOSIMETER FOR PHOTOMETRIC APPLICATIONS

[75] Inventors: Michael F. Wicnienski, Antioch; Donald E. Charles, Lake Zurich, both of Ill.

[73] Assignee: Baxter Travenol Laboratories, Inc.

[21] Appl. No.: 389,430

[22] Filed: Jun. 17, 1982

[51] Int. Cl.³ .............................................. G01J 1/44
[52] U.S. Cl. .................................................... 250/372
[58] Field of Search ............... 356/416; 250/372, 373, 250/432 R, 354.1, 504 R, 205

[56] References Cited

U.S. PATENT DOCUMENTS

| | | | |
|---|---|---|---|
| 3,493,753 | 3/1970 | Stowe | 250/372 |
| 3,629,587 | 12/1971 | Decupper | 250/372 |
| 3,903,422 | 9/1975 | Buhrer | 250/372 X |
| 3,917,948 | 11/1975 | Strutz | 250/372 |
| 4,010,372 | 3/1977 | Adler et al. | 250/372 |
| 4,103,167 | 7/1978 | Ellner | 250/432 R |
| 4,279,254 | 7/1981 | Boschetti et al. | 250/372 X |

Primary Examiner—F. L. Evans
Attorney, Agent, or Firm—Robert A. Benziger; George H. Gerstman; Paul C. Flattery

[57] ABSTRACT

A temperature independent dosimeter is provided for measuring an amount of irradiation of a predetermined frequency. A photodiode (24) operating in its photovoltaic mode is irradiated with the irradiation to produce a signal that is amplitude-proportional to the amplitude of the irradiation. The signal is converted by a pair of operational amplifiers (89, 96) to a plurality of pulses that are proportional in frequency to the amplitude of the signal. The plurality of pulses is counted by a counter (20) and the irradiation is terminated when the count reaches a predetermined amount.

4 Claims, 3 Drawing Figures

DOSIMETER FOR PHOTOMETRIC APPLICATIONS

TECHNICAL FIELD

This invention concerns a process and device for measuring the total optical energy delivered in a system over a period of time, using a relatively temperature independent system.

BACKGROUND ART

Many microbial organisms can have their pathogenic potential inhibited by exposure to ultraviolet light. The organisms vary in susceptibility to this germicidal light. Therefore, in order to kill a number of different organisms, a minimum dose of ultraviolet light must be delivered, which coresonds to the minimum killing dose for the most resistant organism.

Ultraviolet light can be produced by several different mechanisms. The most common source of this light for germicidal use is a mercury arc discharge lamp. The ultraviolet output of mercury arc discharge lamps is a function of several factors, including the age of the lamp, the current at which the lamp is operated and the lamp temperature.

Since a germicidal system based on ultraviolet light requires a minimum dose and since the source of this light is subject to intrinsic variations, it is necessary to utilize a dose monitor in an ultraviolet light type germicidal system.

It is important, however, that the dose monitor be substantially independent of temperature variations, so that the germicidal system can be used under various temperature conditions. A prior art dose monitor is disclosed in Adler U.S. Pat. No. 4,010,372. However, the Adler system is sensitive to temperature variations which can produce inaccurate results.

We have discovered a temperature independent process and device for measuring the amount of irradiation of a predetermined frequency, which process and device is useful in connection with ultraviolet light type germicidal systems. It is to be understood, however, that our process and device is not limited to ultraviolet light type germicidal systems, as our process and device may be used for measuring the amount of irradiation of other frequencies.

DISCLOSURE OF THE INVENTION

In accordance with the present invention, a temperature independent dosimeter is provided for measuring an amount of irradiation. The dosimeter comprises a photodiode operating in its photovoltaic mode, which produces a signal that is amplitude-proportional to the amplitude of the sensed irradiation and is substantially free of temperature effects. Means are coupled to the output of the photodiode for converting the signal to a plurality of pulses that are proportional in frequency to the amplitude of the signal. The converting means comprises a pair of operational amplifiers, with the inverting input of one of the operational amplifiers being responsive to the output of the photodiode. Means couple the output of the one operational amplifier to the inverting input of the other operational amplifier.

Feedback means are provided from the output of the other operational amplifier to the inverting input of the one operational amplifier. Means are provided for counting the pulses and for terminating the irradiation when the count reaches a predetermined amount.

In the illustrative embodiment, the feedback means comprise a switch coupled to the output of the other operational amplifier and the inverting input of the first operational amplifier. The switch is operable to draw current from the inverting input of the first operational amplifier in response to a predetermined voltage level at the output of the other operational amplifier.

In the illustrative embodiment, an adjustable resistance is coupled between the output of the other operational amplifier and the noninverting input of the same operational amplifier, for adjusting the switching thresholds.

A more detailed explanation of the invention is provided in the following description and claims, and is illustrated in the accompanying drawings.

DETAILED DESCRIPTION OF THE ILLUSTRATIVE EMBODIMENTS

Figure 1:
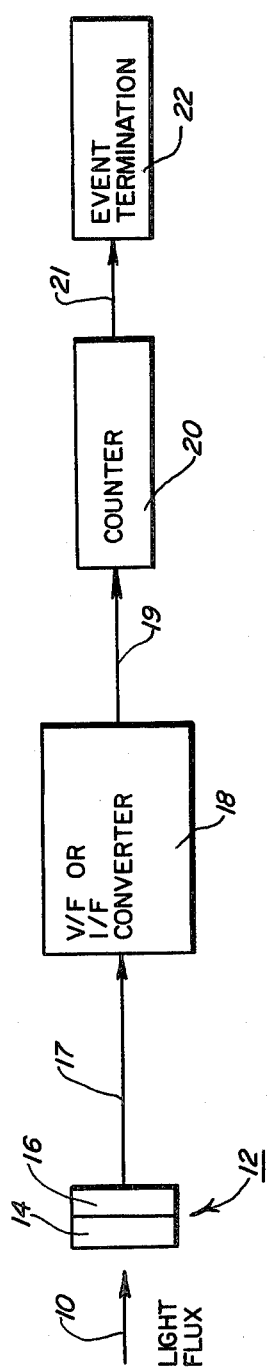
FIG. 1 is a block diagram of a dosimeter constructed in accordance with the principles of the present invention.

Referring to the drawings, in FIG. 1 the light flux 10 irradiates a photodetector 12. Photodetector 12 comprises a filter 14 and a photodiode 16.

In the illustrative embodiment, it is desired to measure the amount of ultraviolet light that has been received. To this end, filter 14 comprises a 2537 Angstrom filter and photodiode 16 comprises an ultraviolet enhanced silicon diode.

The output of photodetector 12 is coupled via line 17 to a voltage to frequency or current to frequency converter 18. Photodetector 12 provides an output current that is proportional to the light received by it. Converter 18 provides pulses having a frequency that is proportional to the amplitude of the voltage or current input. The output of converter 18 is fed via line 19 to a counter 20 which counts the pulses and provides a signal via line 21 when a predetermined number of pulses have been counted. The signal on line 21 is operable to terminate the irradiation by means of an appropriate cutoff circuit 22.

Although no limitation is intended, counter 20 could comprise a digital counter integrated circuit, for example, a CD 4020 14 bit counter. The irradiation dose is halted when bit 14 of counter 20 goes high, and the counter is reset to zero at the start of the cycle.

Figure 2:
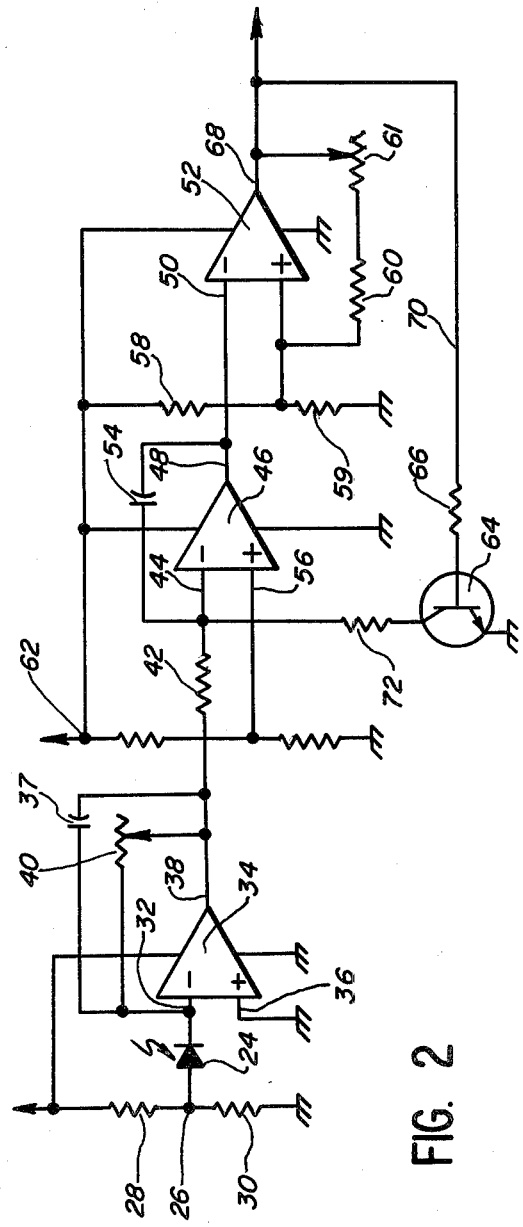
FIG. 2 is a schematic circuit diagram of a portion of the dosimeter of FIG. 1, in accordance with a first embodiment of the present invention.

Referring to FIG. 2, a photodiode 24, such as a silicon diode, is provided having its anode connected to the junction 26 of a voltage divider comprising resistors 28 and 30, and its cathode is coupled to the inverting input 32 of operational amplifier 34. The noninverting input 36 of operational amplifier 34 is coupled to ground. Operational amplifier 34 performs as a current to voltage converter, thereby producing an output voltage that is proportional to the intensity of the light impinging upon photodiode 24.

Photodiode 24, when operated in the photovoltaic mode (no external bias applied), operates as having a large internal resistance in shunt with a relatively large capacitance. In this manner, leaking current effects, which are temperature dependent, are avoided.

When diode 24 is coupled to operational amplifier 34, oscillations generally will occur unless capacitor 37 is added between the inverting input 32 and output 38. Potentiometer 40 also is utilized in this feedback loop to compensate for variations in the sensitivity of diode 24.

The output voltage of operational amplifier 34 is converted from a voltage to a current by means of resistor 42, and this current is applied to the inverting input 44 of operational amplifier 46. The output 48 of operational amplifier 46 is coupled to the inverting input 50 of an operational amplifier 52. The circuit containing operational amplifiers 46 and 52 is a current to frequency converter. As the current to the inverting input 44 increases, the output of operational amplifier 46 decreases and current is developed through capacitor 54 which tends to maintain the inverting input 44 at the same potential as the noninverting input 56. Operational amplifier 52 is configured as a Schmidt trigger, with its switching thresholds determined by resistors 58, 59, 60 and 61 and the magnitude of the voltage at point 62. Resistors 60 and 61 also operate to compensate for production tolerances in the lamp and in the photodetector 24.

When the output voltage of operational amplifier 46 decreases below the lower threshold of Schmidt trigger (operational amplifier) 52, the output of operational amplifier 52 rises to turn on a switch in the form of transistor 64 via resistor 66. Thus the output 68 of operational amplifier 52 is coupled to the base of transistor 64 via line 70 and through resistor 66. The emitter of transistor 64 is coupled to ground and the collector of transistor 64 is coupled to inverting input 44 through resistor 72.

Once transistor 64 is turned on, current is drawn from inverting input 44 through resistor 72 to ground. In response to this, the output of operational amplifier 46 rises and a current is again developed through capacitor 54 which tends to force the voltage at the inverting input 44 to be equal to the voltage at the noninverting input 56. The output voltage of operational amplifier 46 rises to that point which is equal to the upper threshold voltage of Schmidt trigger (operational amplifier 52). At this time, the output 68 goes low to turn off transistor 64 and the cycle repeats. The effect of this operation is the production of pulses which have a frequency that is proportional to the input current applied to the circuit at inverting input 32.

Figure 3:
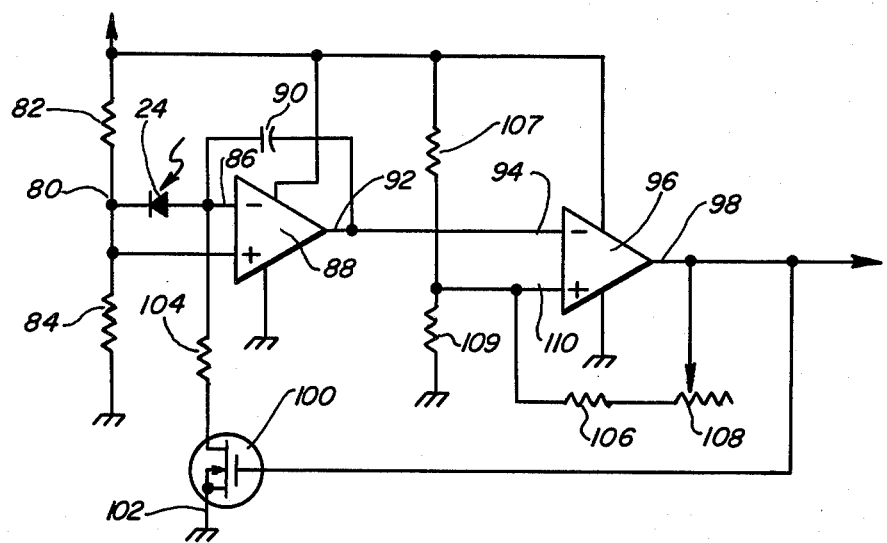
FIG. 3 is a schematic circuit diagram of a portion of the dosimeter of FIG. 1, in accordance with a second embodiment of the present invention.

Referring now to FIG. 3, silicon diode 24 has its cathode coupled to junction 80 of a voltage divider comprising resistors 82 and 84, and the anode of photodiode 24 is connected to the inverting input 86 of an operational amplifier 88. Again, diode 24 is operated in the photovoltaic mode to avoid leakage current effects. Capacitor 90 is connected between inverting input 86 and output 92 of operational amplifier 88. Output 92 is connected to the inverting input 94 of an operational amplifier 96, the output 98 of which is connected to the gate of an MOS FET 100. MOS FET 100 is connected to ground via line 102 and through resistor 104 to inverting input 86.

A resistor 106 and potentiometer 108 are connected between the noninverting input 110 of operational amplifier 96 and output 98, to compensate for production tolerances in the lamp and in the photodetector. Resistors 107, 109, 106 and 108 are operable to adjust the thresholds of the Schmidt trigger.

In the FIG. 3 circuit, photodiode 24 is reversed and coupled directly to the voltage to frequency converter that includes operational amplifiers 88 and 96. Operational amplifier 88 operates similarly to operational amplifier 46 of the FIG. 2 circuit. Operational amplifier 96 is configured as a Schmidt trigger and operates similarly to operational amplifier 52 of the FIG. 2 circuit. The use of a Schmidt trigger enables the switching thresholds to remain substantially constant with temperature. By using MOS FET 100 instead of a transistor, there is lower leakage current in the off state of the switch and there is no need to use a base resistor 66 as in the FIG. 2 circuit.

In the FIGS. 2 and 3 circuits respectively, outputs 68 and 98 of operational amplifiers 52 and 96 are coupled to digital counter 20 for counting the pulses that are generated by the converter. Once the counter 20 counts up to a predetermined amount, a signal is provided on line 21 (FIG. 1) to terminate the irradiation.

Although two illustrative embodiments of the invention have been shown and described, it is to be understood that various modifications and substitutions may be made by those skilled in the art without departing from the novel spirit and scope of the present invention.

What is claimed is:

1. A temperature independent dosimeter for measuring an amount of irradiation, which comprises:
   a photodiode, operating in its photovoltaic mode, which produces a signal that is amplitude-proportional to the amplitude of the sensed irradiation and is substantially free of temperature effects;
   means coupled to the output of the photodiode for converting the signal to a plurality of pulses that are proportional in frequency to the amplitude of the signal;
   said converting means comprising a pair of operational amplifiers, with the inverting input of one of said operational amplifiers being responsive to the output of the photodiode;
   means coupling the output of said one operational amplifier to the inverting input of the other operational amplifier;
   feedback means from the output of said other operational amplifier to the inverting input of said one operational amplifier;
   means for counting said pulses; and
   means for terminating the irradiation when the count reaches a predetermined amount.

2. A temperature independent dosimeter as described to claim 1, including a filter coupled to the input of the photodiode for filtering out the irradiation other than the predetermined frequency irradiation.

3. A temperature independent dosimeter as described in claim 1, said feedback means comprising a switch coupled to the output of said other operational amplifier and the inverting input of said one operational amplifier and operable to draw current from the inverting input of said one operational amplifier in response to a predetermined voltage level at the output of said other operational amplifier; and an adjustable resistance coupled between the output of said other operational amplifier and the non-inverting input of said other operational amplifier for adjusting the switching thesholds.

4. A temperature independent dosimeter as described in claim 1, in which said other operational amplifier is configured as a Schmidt trigger.

* * * * *